United States Patent
Abbott et al.

(10) Patent No.: US 6,636,819 B1
(45) Date of Patent: Oct. 21, 2003

(54) METHOD FOR IMPROVING THE PERFORMANCE OF MICROMACHINED DEVICES

(75) Inventors: Eric Abbott, North Bend, WA (US); Randy Sprague, Carnation, WA (US); James Michael McLaughlin, Bothell, WA (US)

(73) Assignee: L-3 Communications Corporation, Redmond, WA (US)

(*) Notice: Subject to any disclaimer, the term of this patent is extended or adjusted under 35 U.S.C. 154(b) by 53 days.

(21) Appl. No.: 09/680,375

(22) Filed: Oct. 5, 2000

Related U.S. Application Data

(60) Provisional application No. 60/157,903, filed on Oct. 5, 1999.

(51) Int. Cl.[7] .............................................. G01C 19/00
(52) U.S. Cl. ............................. 702/96; 702/72; 702/75; 702/124; 702/151; 702/182
(58) Field of Search ............................. 702/72, 74, 75, 702/92–95, 106, 107, 115, 116, 124, 126, 182, 183, 141, 189, 194, 136, 99, FOR 103–104, FOR 107, FOR 134–135, FOR 142, FOR 150–151, FOR 156–163, FOR 170–172; 73/504.02, 504.03, 504.04, 504.12, 504.14–504.16, 510, 514.36, 514.37; 375/327, 322

(56) References Cited

U.S. PATENT DOCUMENTS

| | | |
|---|---|---|
| 4,210,962 A | 7/1980 | Marsh et al. |
| 4,510,802 A | 4/1985 | Peters |
| 4,590,801 A | 5/1986 | Merhav |
| 4,665,748 A | 5/1987 | Peters |
| 4,799,385 A | 1/1989 | Hulsing et al. |
| 4,953,085 A | 8/1990 | Atkins |
| 5,241,861 A | 9/1993 | Hulsing, II |
| 5,301,317 A | 4/1994 | Lohman et al. |
| 5,331,853 A | 7/1994 | Hulsing, II |
| 5,396,797 A | 3/1995 | Hulsing, II |
| 5,473,731 A | 12/1995 | Seligson |
| 5,546,476 A | 8/1996 | Mitaka et al. |
| 5,581,650 A | 12/1996 | Kamiya |
| 5,656,778 A * | 8/1997 | Roszhart .................. 73/504.04 |
| 5,671,403 A | 9/1997 | Shekita et al. |
| 5,691,472 A | 11/1997 | Petri |
| 5,717,140 A | 2/1998 | Hulsing, II |
| 5,739,431 A | 4/1998 | Petri |
| 5,841,664 A | 11/1998 | Cai et al. |
| 5,866,816 A | 2/1999 | Hulsing, II |
| 5,869,760 A * | 2/1999 | Geen ........................ 73/504.04 |
| 5,886,259 A | 3/1999 | Hulsing, II |
| 5,886,895 A | 3/1999 | Kita et al. |
| 5,894,090 A * | 4/1999 | Tang et al. ................. 331/158 |
| 5,905,201 A * | 5/1999 | Petri ........................ 73/504.03 |
| 5,920,011 A * | 7/1999 | Hulsing, II .............. 73/504.04 |
| 5,962,784 A * | 10/1999 | Hulsing, II .............. 73/504.03 |
| 5,974,879 A * | 11/1999 | Hulsing, II .................. 438/50 |
| 6,023,972 A | 2/2000 | Hulsing, II |
| 6,041,655 A | 3/2000 | Foote |
| 6,062,082 A * | 5/2000 | Guenther et al. ......... 73/504.03 |
| 6,098,011 A | 8/2000 | Scott |
| 6,101,470 A | 8/2000 | Eide et al. |
| 6,101,878 A | 8/2000 | Watarai |
| 6,118,822 A | 9/2000 | Bist |
| 6,118,829 A | 9/2000 | North |
| 6,119,052 A | 9/2000 | Guenther et al. |
| 6,311,555 B1 * | 11/2001 | McCall et al. .................. 700/1 |
| 6,386,032 B1 * | 5/2002 | Lemkin et al. .......... 73/504.02 |
| 6,392,220 B1 * | 5/2002 | Slater et al. ................ 250/216 |
| 2002/0017132 A1 * | 2/2002 | McNie et al. ............ 73/504.02 |

\* cited by examiner

*Primary Examiner*—Marc S. Hoff
*Assistant Examiner*—Carol S. W. Tsai
(74) *Attorney, Agent, or Firm*—Proskauer Rose LLP

(57) ABSTRACT

A method for improving the performance of a micromachined device, preferably an angular rate microsensor, is provided. The method includes collecting data on rate bias over a selected operating phase demodulation angles for at least one tine of a microsensor and determining optimum settings for phase demodulation angles at which the rate bias hysteresis over temperature is at a minimum by applying dynamic programming.

5 Claims, 8 Drawing Sheets

METHOD FOR IMPROVING THE PERFORMANCE OF MICROMACHINED DEVICES

This application claims priority from Provisional Patent Application Ser. No. 60/157903 entitled "An Algorithm for Identifying the Demodulation Phases that Minimize Micromachined Rate Bias Hysteresis Over Temperature" filed on Oct. 5, 1999, the entire specification of which is incorporated herein by reference. This invention relates to a method for improving the performance of micromachined devices. More specifically, this invention relates to a method for minimizing rate bias hysteresis over temperature for micromachined angular rate sensors. One such sensor is the μSCIRAS™ product manufactured by AlliedSignal of Redmond, Wash. U.S. Pat. Nos. 4,510,802; 4,590,801; 4,654,663; 4,665,748; 4,799,385; 5,396,797 and 5,866,816, are related to angular rate sensor technology. The performance of the micromachined rate sensor depends on many factors. Unfortunately, developers of micromachined devices do not have control over all of the factors that affect the performance of the micromachined rate sensor, but there are some parameters over which designers do have control. In a micromachined angular rate sensor, two such parameters are referred to as the "phase demodulation angles". These parameters affect one of the dominant error sources in the angular rate measurement, the magnitude of the bias hysteresis over temperature.

BACKGROUND OF THE INVENTION

The phase demodulation angles are numerical values that are stored in the micromachine firmware. During normal operation, these parameters are used by the digital electronics of the microsensor to govern the operation of the signal processing that they implement. Empirical evidence has revealed that a significant source of poor performance (i.e. the rate bias hysteresis) will change depending on the phase demodulation angles used in the digital signal processing of the system.

Accordingly, there is a need in the art of micromachined devices to provide methods for improving their performance by minimizing the rate bias hysteresis.

OBJECTS OF THE INVENTION

It is an object of the invention to provide methods to improve the performance of micromachined devices.

It is another object of the invention to minimize the rate bias hysteresis over temperature of micromachined devices, preferably angular rate microsensors.

It is another object of the invention to provide methods of optimizing phase demodulation angles at which the bias hysteresis over temperature is minimized.

SUMMARY OF THE INVENTION

The present invention provides a method for improving the performance of a micromachined device having at least one sensing element and capable of producing a frequency modulated signal. The micromachined device is preferably a silicon microsensor that can measure angular rate and/or linear acceleration of a moving object. The sensing element of the microsensor can be at least one tine having a rate bias used for determining a rate bias hysteresis over temperature. The performance of the micromachined device is improved by determining at least two phase demodulation angles at which the rate bias hysteresis over temperature is at a minimum.

The present invention also provides a micromachined device having at least one sensing element, wherein the rate bias hysteresis over temperature of the sensing element has been minimized by using the method of generating optimum phase demodulation angles according to the method of the present invention.

As a result of the present invention a unique method of obtaining and reducing data from a micromachined sensor that can be utilized to derive phase demodulation angles that minimize the bias hysteresis is provided. This method produces an optimum set of phase demodulation angles. The data collection method involves the collection of rate bias data over temperature using various phase demodulation angle settings. The subsequent data reduction method involves the minimization of the rate bias hysteresis over temperature using methods of dynamic programming optimization.

Other improvements which the present invention provides over the prior art will be identified as a result of the following description which sets for the preferred embodiment of the present invention. The description is not in any way intended to limit the scope of the present invention, but rather only to provide a working example of the present preferred embodiments. The scope of the present invention will be pointed out in the appended claims.

BRIEF DESCRIPTION OF THE DRAWINGS

With reference to the accompanying eight sheets of drawings.

DETAILED DESCRIPTION OF THE INVENTION

The present invention is a method for improving the performance of a micromachined device. The method of the present invention is applicable to any micromachined device capable of producing a frequency modulated signal.

A useful micromachined device which can benefit from the method provided by the invention is a micromachined microsensor that can measure both linear acceleration and angular rate. The microsensor can be made of quartz, metal alloys, silicon and the like. The micromachined device should have at least one sensing element such as, for example, a tine. The output of the device is a set of three information-bearing signals that can be processed to obtain the desired rate and acceleration measurement. Successfully decoding the information in these signals depends on certain parameters that control the behavior of digital electronic circuitry that processes the signals. Two of these parameters are referred to as phase demodulation angles, phase settings, or, simply, phases. There are two phase settings that are under control of the digital electronics in the device. Each phase may be set independently of the other, and the bias error in the output of the device depends strongly on the phase settings.

Ideally, the output of the micromachine would have a bias error that is always equal to zero. In principle, the phase demodulation angles can be set so that the bias error in the output of the device is exactly zero. However, empirical evidence has shown that even if the phase settings are held constant, the rate bias error is not constant when the temperature of the device changes. This variation occurs because the relationship between the phase settings and rate bias error varies in an unpredictable way with temperature.

Unfortunately, this relationship cannot be modeled with perfect accuracy. Even after the phase/bias relationship is modeled over temperature, there are residual bias errors that are unacceptably large. The end result is that the bias error cannot be completely compensated with temperature modeling alone. However, it is possible to minimize the impact of these residual errors by finding those phase demodulation angles that produce a minimum residual bias error. To this end, an optimization method has been developed to find those phases that minimize the residual bias error in the angular rate output.

System for Minimizing Rate Bias Hysteresis

Figure 1:
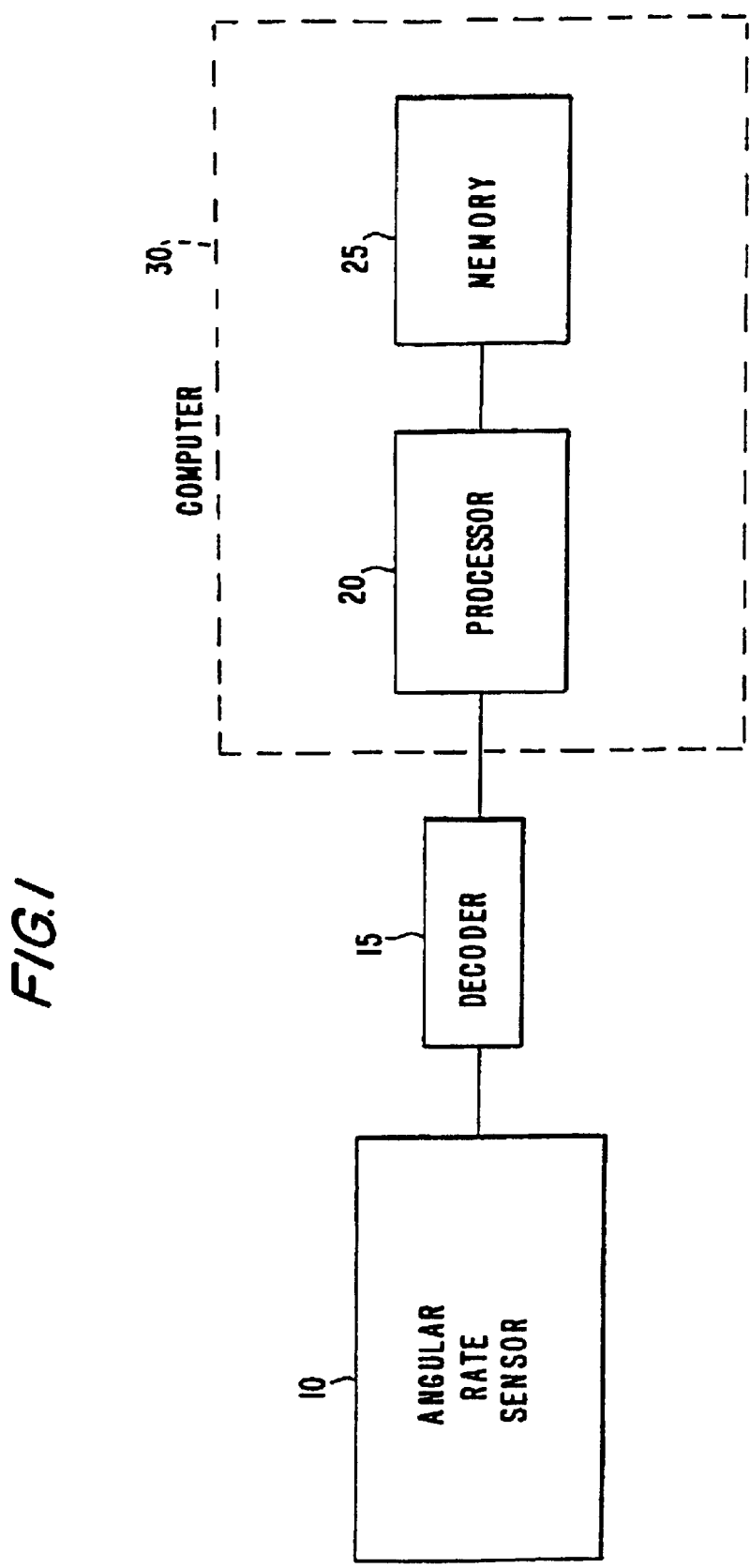
FIG. 1 is a diagram of a system for minimizing rate bias hysteresis.

Referring now to the drawings, FIG. 1 shows an arrangement of the rate bias hysteresis minimizing system according to the present invention. An angular rate sensor 10 produces an output which is decoded by decoder 15 based on parameters such as phase demodulation angles. The decoder is connected to a processor 20, which computes an optimum set of phase demodulation angles by utilizing the method of the present invention. Alternatively, the decoder 15 could be a part of the computer 30. The optimum set of phase angles is stored in memory 25 of the computer 30, which also includes the processor 20. Alternatively, as described further, if a polynomial is fit to the optimum phase settings, the coefficients of this polynomial are also stored in memory 25.

Data Collection

Finding the phase demodulation settings that minimize bias hysteresis is accomplished by first collecting data from the micromachined device. The data required from the device is obtained according to the following procedure:

1. The device and its associated hardware is set in a temperature chamber that is immobile.
2. The temperature of the device is slowly varied over a selected temperature range. For example, the temperature can be varied from 25° C. to 60° C. to 0° C. to 25° C. It is to be understood that this temperature range serves only as an example. The data collection method described herein is not restricted to this temperate range, and the optimization method described below can be applied to data collected over any temperature range.
3. While the temperature is changing, the phase demodulation angles are set to their minimum values, $\phi_1$ and $\phi_2$.
4. The rate outputs from tines 1 and 2 of the micromachined device is for several seconds, and these average values are recorded. The current temperature, T is recorded. The sum of the two values recorded represent the rate bias error for both tines at the temperature T and for the phase settings ($\phi_1$, $\phi_2$).
5. The phase settings $\phi_1$ and $\phi_2$ are incremented by 1 degree each. If the phase settings have reached some previously specified maximum value, they are reset to their original minimum values.
6. Steps 3 through 5 are repeated until the temperature profile reaches its end.

Figure 2:
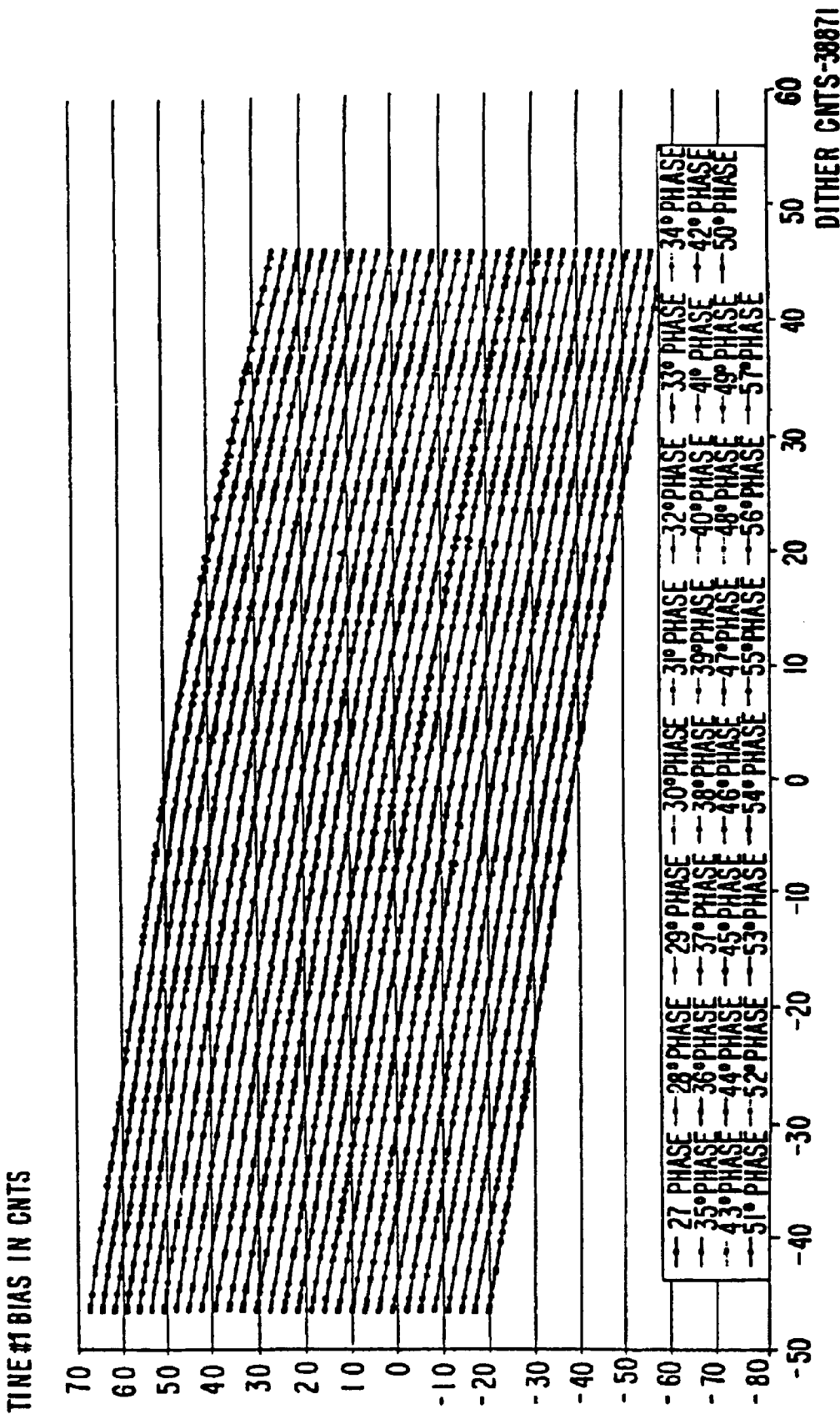
FIG. 2 is a graph showing a set of curves each of which represents the rate bias output for tine 1 of the micromachined device for a given phase setting.
Figure 3:
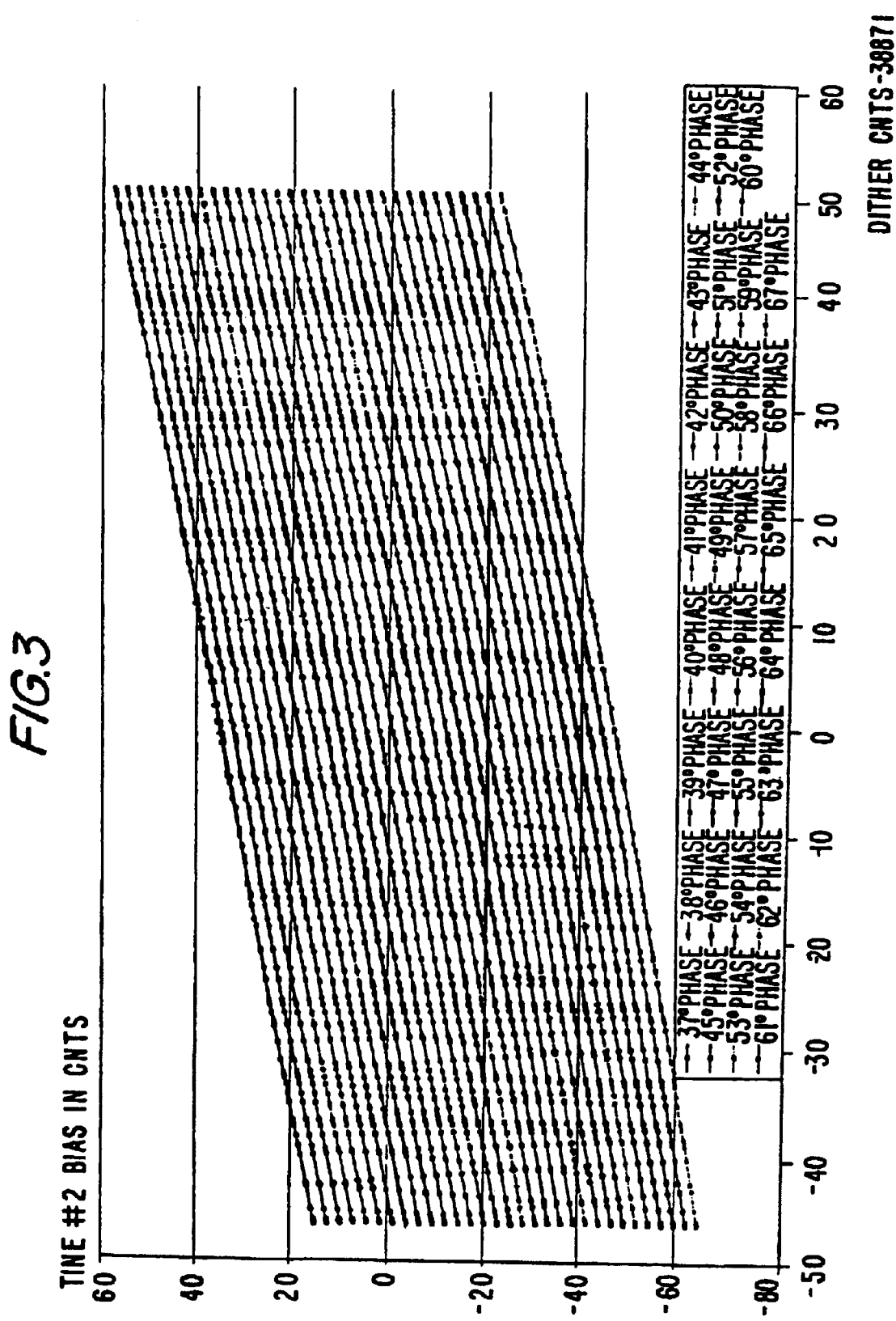
FIG. 3 is a graph showing a set of curves each of which represents the rate bias output for tine 2 of the micromachined device for a given phase setting.

FIGS. 2 and 3 show an example set of data collected from a single device. As the figures show, there are several curves, each of which represents the rate bias output over temperature from each tine of the device for a given phase setting. In each figure the x-axis shows the temperature in degrees centigrade and the y-axis illustrates the rate bias over temperature. The actual measurement is given in counts. A count is the measurement of one period of vibration of a tine. Counts can be converted to degrees/hour, a more conventional measurement unit.

After the data collection is complete, a set of data has been obtained that includes the rate bias outputs from both tines at various discrete temperatures for various phase settings. Once this data has been collected, the method can be applied to find the phase settings which, over the operating temperature range, result in the lowest rate bias hysteresis.

Finding The Optimum Phases Over Temperature

1. Dynamic Programming

The method for finding the optimum phases settings utilizes an optimization method referred to as dynamic programming. Dynamic programming is a tool that can be applied to discrete dynamic systems. The purpose of dynamic programming is to find a set of parameters that minimize (or maximize) some performance criterion for a system that varies as a function of some independent variable. Before describing the manner in which dynamic programming applies to the selection of optimal micromachined phase settings, it is instructive to provide the reader with an explanation of the principles of dynamic programming. The concepts behind dynamic programming problem can best be described with an example.

Figure 4:
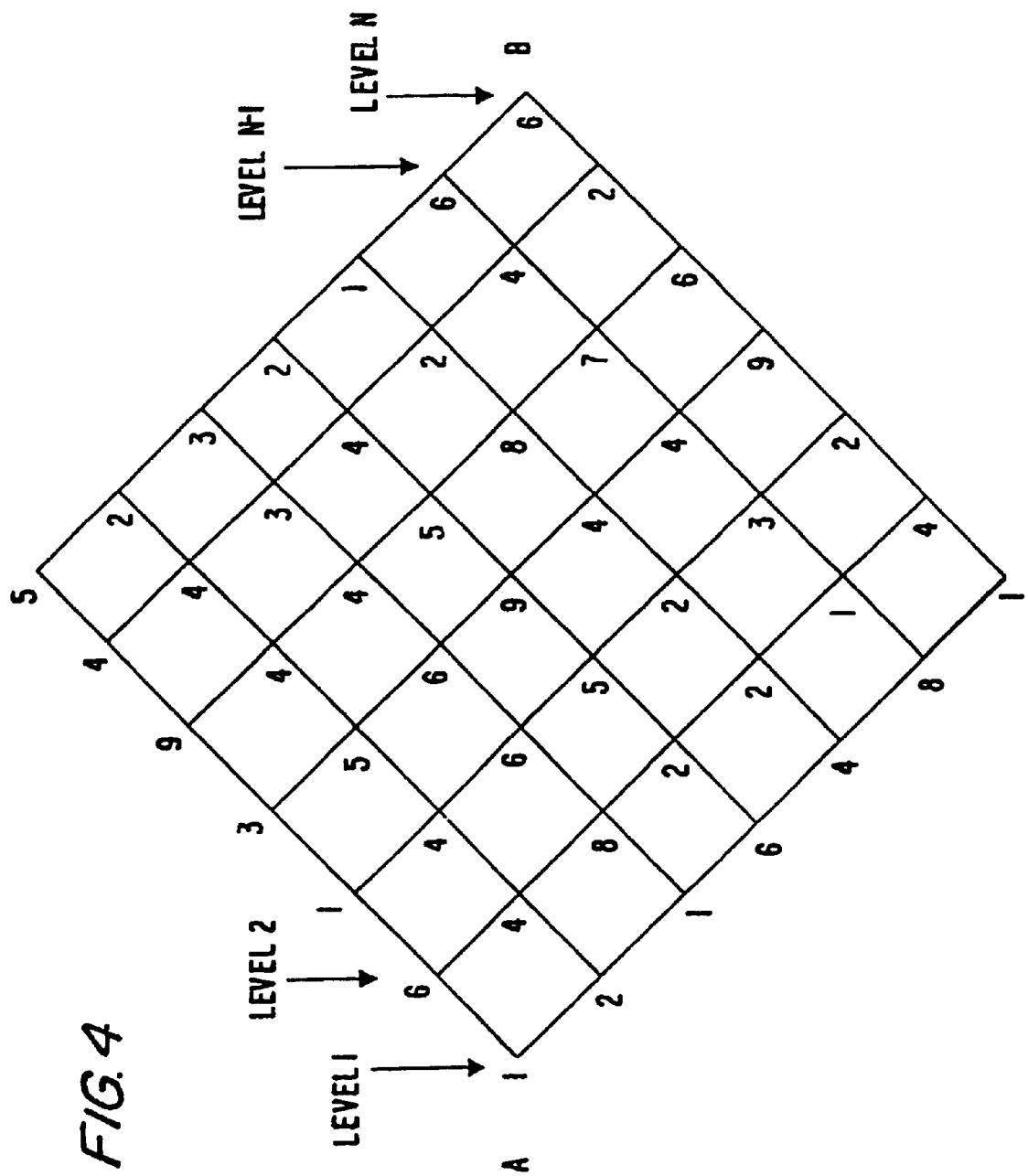
FIG. 4 is an explanatory diagram of a dynamic programming grid used to find an optimal path from point A to point B.

Suppose that we wish to find an optimal path from A to B in FIG. 4. Movement is restricted to take place only from left to right and must pass through the intersections in the grid, which are referred to as "nodes." All of the nodes that lie on a vertical line define a "level" of the grid, and movement is permitted between levels only and cannot take place between nodes on a single level. The numbers at the intersections in the grid represent the "cost" or "penalty" for passing through that intersection. The goal is to find the path from A to B that has the smallest cumulative cost.

Figure 5:
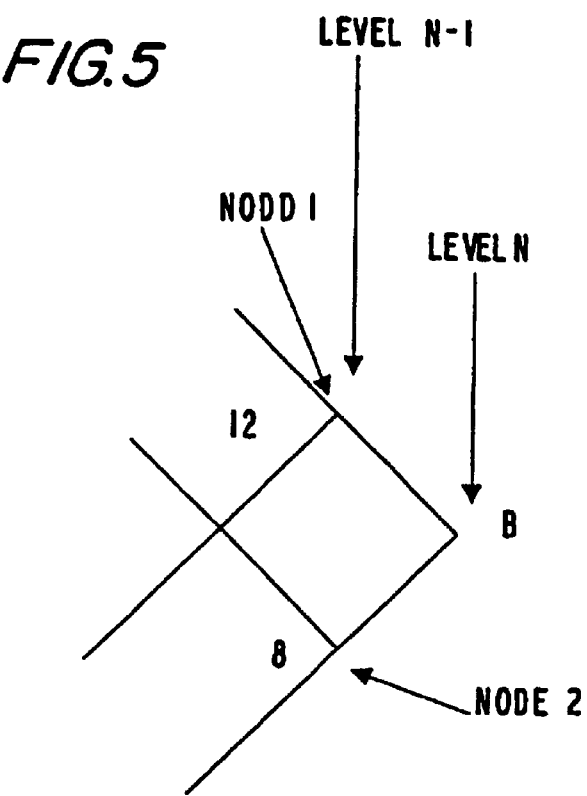
FIG. 5 is a section of the dynamic programming grid as shown in FIG. 4 illustrating a start of a method of finding an optimal path from point A to point B starting at point B.

Attempting to identify the lowest-cost path by evaluating the cumulative cost of every possible path from point A to point B is prohibitively expensive. The solution to this problem is to start at point B and work backwards through the grid to point A. For the example in FIG. 4, the cost of moving from level N to level N-1 is easy to compute because there are only two possible paths from one level to the next. FIG. 5 shows the cumulative cost to move from level N to either node of level N-1. The cost of going to Node 1 is the cost of being at point B (6) plus the cost of being at Node 1 (6). The cost of going to Node 2 is the cost of being at point B (6) plus the cost of being at Node 2 (2). From this it can be seen that the lowest cost path from level N-1 to level N is equal to 8 and is through Node 2.

Figure 6:
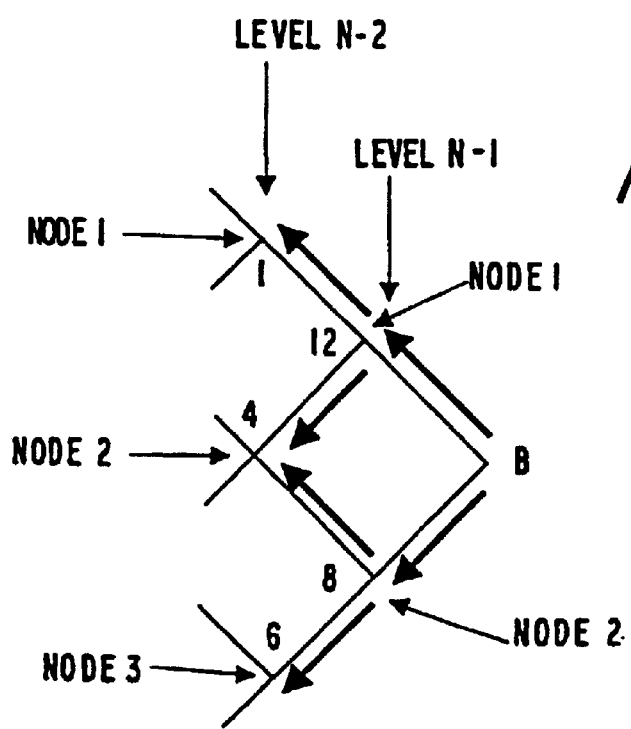
FIG. 6 is a section of the dynamic programming grid shown in FIG. 4 illustrating the cumulative costs to proceed from level N to Level N-2.

To find the lowest cost path from level N-2 to level N, one need only add the costs at each node of level N-2 to the cumulative costs at level N-1 shown in FIG. 5. FIG. 6 shows the information needed to make this calculation. The diagram shows, at level N-1, the cumulative cost to proceed from level N-1 to level N. It also shows the cost of occupying each node (Nodes 1, 2, and 3) at level N-2, and the arrows show all possible directions of travel from point B to each node on level N-2.

From this diagram, one can deduce that the cost of moving from Node 1 (of level N-2) to point B is 13 and the cost of moving from Node 3 to point B is 14. The cost of moving from point B to Node 2 of level N-2 depends on whether the path passes through Node 1 or Node 2 of level N-1. If the path passes through Node 1, the cost is 12+4=16; if the path passes through Node 2, the cost is 8+4=12. So, the lowest cost path from point B to each node of level N-2 is 13 (Node 1), 12 (Node 2), and 14 (Node 3). If the optimization were to end here, then the lowest cumulative cost of traveling between level N-2 and point B would be obtained by moving from Node 2 of level N-2 to point B through Node 2 of level N-1. To continue the optimization through the grid to point A, one need only proceed backward through the grid in the manner outlined above.

2. Application To The Method of Finding Optimum Phases

The problem of finding the optimum phases $\phi_1$ and $\phi_2$ over temperature can be cast into the form of a dynamic programming problem. For this application, each "level" in the grid corresponds to a different discrete temperature, each "node" in the grid corresponds to a particular ($\phi_1$, $\phi_2$) pair, and the "cost" of occupying a node corresponds to the value of a performance-related index. When one recognizes this relationship between phase settings, performance, and temperature, then it becomes apparent that dynamic programming provides a suitable solution to this problem.

The only point that requires further clarification is the performance-related index that is needed to assign a "cost" to each node in the grid. The simplest performance index is the rate bias hysteresis. After all, minimizing the rate bias hysteresis is a direct measure of performance that we wish to minimize. However, further consideration reveals other requirements that limit the admissible values of $\phi_1$ and $\phi_2$. The following section describes the restrictions placed on $\phi_1$ and $\phi_2$ and includes a derivation of the performance index that is used in the dynamic programming optimization.

3. Restrictions on the Choice of $\phi_1$ and $\phi_2$ 3.1 Large Changes in Phase Over Temperature If we take rate bias hysteresis as our performance index, then, at any given temperature, there is a unique ($\phi_1$, $\phi_2$) phase pair that minimizes the rate bias hysteresis at that temperature. However, simply choosing $\phi_1$ and $\phi_2$ in this manner results in large discrete changes in $\phi_1$ and $\phi_2$ from one temperature to the next because noise in the data can create false minima. Furthermore, discontinuous changes in phase setting with temperature are undesirable and do not make sense in terms of the device's physical operation. Therefore, it is necessary to restrict the size of the change in phase that can be made from one discrete temperature to the next. The manner in which this restriction is incorporated into the optimization is shown below.

3.2 Phase Settings Near Other Settings With Large Hysteresis

In addition to avoiding discrete jumps in phase from one temperature to the next, there are other restrictions that we wish to place on our choice of $\phi_1$ and $\phi_2$. For example, we wish to avoid ($\phi_1$, $\phi_2$) pairs that are near other ($\phi_1$, $\phi_2$) pairs for which the rate bias hysteresis is large. So, even if some phase setting ($\phi_{1,0}$, $\phi_{2,0}$) results in the lowest rate bias hysteresis at temperature $T_0$, we should not use this phase setting if the rate bias hysteresis is large at the phase setting ($\phi_{1,0}+\delta$, $\phi_{2,0}+\delta$), where $\delta$ is some "small" phase change. The rationale for implementing this restriction is that the phase/bias relationship might be unstable over time; this implies that a phase setting that originally corresponded to a small rate bias hysteresis could take on the characteristics of its neighboring phase settings, ultimately resulting in a larger rate bias hysteresis.

3.3 Phase Settings for Which Individual Tine Hystereses Are Large

Another restriction that we wish to place on the choice of $\phi_1$ and $\phi_2$ involves the bias output of each tine individually. To understand this issue, one needs to understand that the angular rate output of the device is the sum of the outputs from each tine. Therefore, the bias hysteresis in the rate output is the algebraic sum of the bias in each tine individually. Therefore, if the bias in the two tines have opposite signs and nearly equal magnitudes, then the individual tine biases will cancel, resulting in a net bias that is smaller than either tine bias alone. However, it is more desirable for the individual tine biases to be small (rather than large). The reason is that it is more likely that small changes in the device as it ages will result in a large net bias if the individual tine biases are large. Therefore, we wish to avoid ($\phi_1$, $\phi_2$) pairs for which the individual tine biases are large.

3.4 Phase Settings to Improve Performance in a Vibration Environment

In addition to the restrictions enumerated above, there are others that can be placed on the choice of $\phi_1$ and $\phi_2$. For example, in the presence of a high vibration environment, it may be necessary to fix the value of $\phi_1$ relative to $\phi_2$. Mathematically, this can be stated as requiring that the difference between $\phi_1$ and $\phi_2$ remain constant. Restricting $\phi_1$ and $\phi_2$ in this fashion improves the performance of the $\mu$SCIRAS device in the presence of high vibration because it forces the signal processing electronics to eliminate timing differences in the paddles' response to the vibration input. Under these circumstances, it may be desirable to restrict the value of ($\phi_1-\phi_2$) to be constant.

4. The Cost Function

As described above, because of the restrictions placed on our choice of $\phi_1$ and $\phi_2$ choosing the optimum ($\phi_1$, $\phi_2$) pair over temperature is more complicated than simply choosing that pair corresponding to the minimum bias hysteresis. The "optimum" choice of phase over temperature must take into consideration all of the competing restrictions on the phase settings. In order to find those phase settings that maintain a low bias hysteresis and simultaneously take into consideration the restrictions on $\phi_1$ and $\phi_2$, we define the following cost function:

$$J = W_\theta \theta(\phi_1, \phi_2) + W_\phi \Delta\phi^2 + W_N \text{Avg}(\theta_1, \theta_2, \ldots, \theta_n) + W_T(\theta_{T1}^2 + \theta_{T2}^2) \quad (1)$$

where $\theta(\phi_1, \phi_2)$ is the rate bias hysteresis at ($\phi_1,\phi_2$), $\Delta\phi$ is the change in phase from the previous temperature to the current temperature, $\text{Avg}(\theta_1,\theta_2, \ldots, \theta_n)$ is the average value of the rate bias hysteresis evaluated at n phase pairs that neighbor ($\phi_1$, $\phi_2$), and $\theta_{T1}$ and $\theta_{T2}$ are the rate biases for tines 1 and 2 at ($\phi_1$, $\phi_2$). Note that n is an integer identifying a phase pair that neighbors the phase demodulation angles $\phi_1$, $\phi_2$. The neighbors of the phase pair ($\phi_1$, $\phi_2$) are defined as any set of phase pairs that symmetrically surround ($\phi_1$, $\phi_2$) in the two-dimensional space consisting of all admissible values of $(\phi_1, \phi_2)$. For example, one could define the neighbors of $(\phi_1, \phi_2)$. to be the set of four phase pairs given by $(\phi_1 \pm \delta\phi, \phi_2 \pm \delta\phi)$. In this example, n would be equal to 4, and the quantity $\delta\phi$ could be chosen arbitrarily by the analyst. As an example, on can refer to Step 5 of the Data Collection method described above, in which $\delta\phi$ is set to 1 degree. Judicious selection of $\delta\phi$ requires that $\delta\phi$ be much smaller than the full range over which $\phi_1$ and $\phi_2$ vary.

The quantities $W_\Theta$, $W_\phi$, $W_N$, and $W_T$ are weights that cause the individual penalties to figure more or less prominently into the total cost. These weights should be chosen with care because they have a strong influence on the outcome of the cost function J. Numerically, these weights can be finite numbers greater or equal to 0. There is no prescribed means for the selection of numerical values for the weights. Numerical values for the weights embody the analyst's judgment as the relative importance of each of the restrictions placed on $\phi_1, \phi_2$, as represented in each of the terms on the righthand side of the equation from the cost function J. Selection of values for the weights is thus necessarily left to the judgment of the analyst. It is noted that the cost function J, as defined, does not include the restriction requirement described to improve performance in a high vibration environment.

For example, one method for choosing numerical values for the weights $W_\Theta$, $W_\phi$, $W_N$, and $W_T$ is to normalize the weights so that each restriction on the phase pair $(\phi_1, \phi_2)$ is assigned approximately equal importance. Specifically, if the weights were assigned as follows:

$$W_\Theta = \frac{1}{\theta(\phi_1, \phi_2)_{max}}$$

$$W_\phi = \frac{1}{1 \text{ degree}}$$

$$W_N = \frac{1}{\max[\text{Avg}(\theta_1, \theta_2, \ldots, \theta_N)]}$$

$$W_T = \frac{1}{\max(\theta_1^2 + \theta_2^2)}$$

where $\Theta(\phi_1, \phi_2)_{max}$ is the maximum value of $\Theta(\phi_1, \phi_2)$ for all $(\phi_1, \phi_2)$ pairs over all temperatures, $\max[\text{Avg}(\Theta_1, \Theta_2, \ldots, \Theta_N)]$ is the maximum value of $\text{Avg}(\Theta_1, \Theta_2, \ldots, \Theta_N)$ for all $\Theta(\phi_1, \phi_2)$, and $\max(\Theta_1^2 + \Theta_2^2)$ is the maximum value of $(\Theta_1^2 + \Theta_2^2)$ for all $\Theta(\phi_1, \phi_2)$. The value for $W_\phi$ above is based on our experience as to a reasonable value for this weight and is consistent with the intent of this example. Assigning values in this fashion could approximately normalize the weights so that none of the terms in the cost function always dominate the value of J.

The cost function is calculated for every $(\phi_1, \phi_2)$ "node" at every temperature. As the form of the function indicates, it mathematically incorporates a "penalty" for poor performance (i.e. rate bias hysteresis) plus a "penalty" for violations of the restrictions on phase. It therefore embodies the performance index and the restrictions that we placed on the phase settings. A dynamic programming method can be applied to minimize this cost function over the desired temperature range.

5. The Method Mechanization

The method is applied by first choosing a $(\phi_1, \phi_2)$ pair at the highest temperature i.e., point B in FIG. 4. The value of J is then evaluated. Then the method steps backward in temperature, recording the minimum cumulative cost incurred in moving from the highest temperature to the next highest temperature. As this process proceeds, the method records those $(\phi_1, \phi_2)$ pairs at each temperature that lie on the lowest-cost path. When the lowest temperature is reached, the method will have found the phase-temperature profile that, over the full temperature range, will produce the lowest cumulative cost.

The steps of the method are as follows:

1. The rate bias residuals for both tines at every phase setting is computed. A $4^{th}$ order polynomial is applied to fit to the bias outputs recorded for both tines over temperature. The measured data is subtracted from the polynomial fit. The results thus obtained are referred to as bias residuals.

Figure 7A:
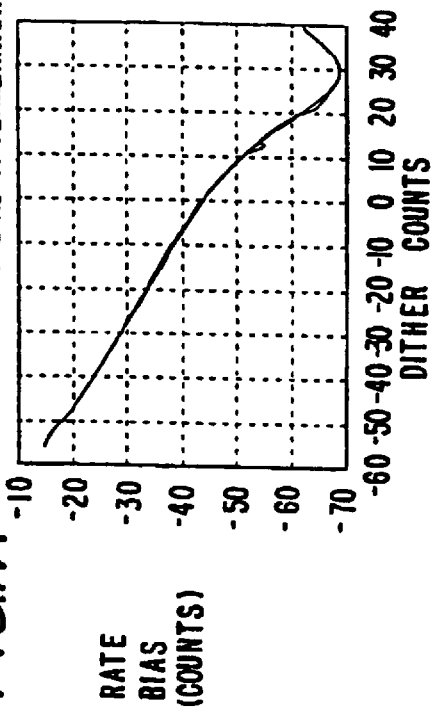
FIG. 7 illustrates steps 1 and 2 of the method of the present invention.
Figure 7C:
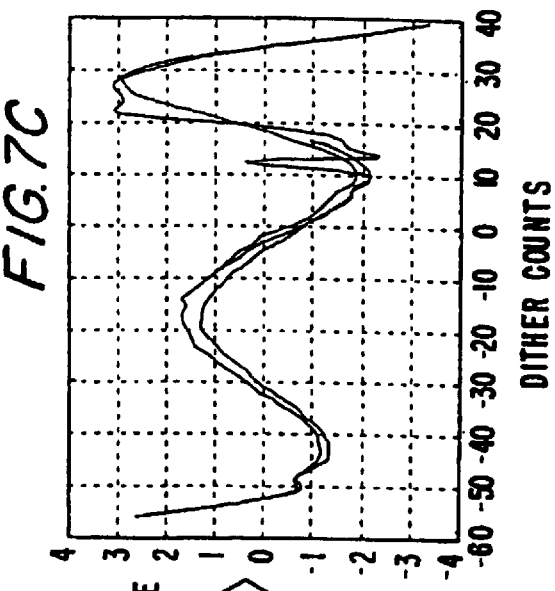
Figure 7B:
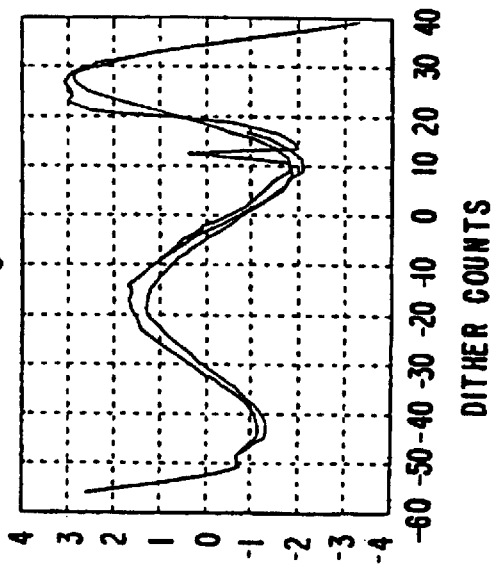

2. A cubic spline is fit to the bias residuals versus temperature. FIG. 7 illustrates steps 1 and 2.

3. At a given temperature, the residuals from tine 1 at every phase setting to the residuals for tine 2 are added at every other phase setting. Adding the individual tine residuals provides a prediction of the total rate bias hysteresis. If the rate bias is measured at N phases for tine 1 and N phases for tine 2, then this step results in $N^2$ sets of rate bias residuals over temperature.

4. The area within each of the $N^2$ hysteresis curves over temperature is computed.

Figure 8:
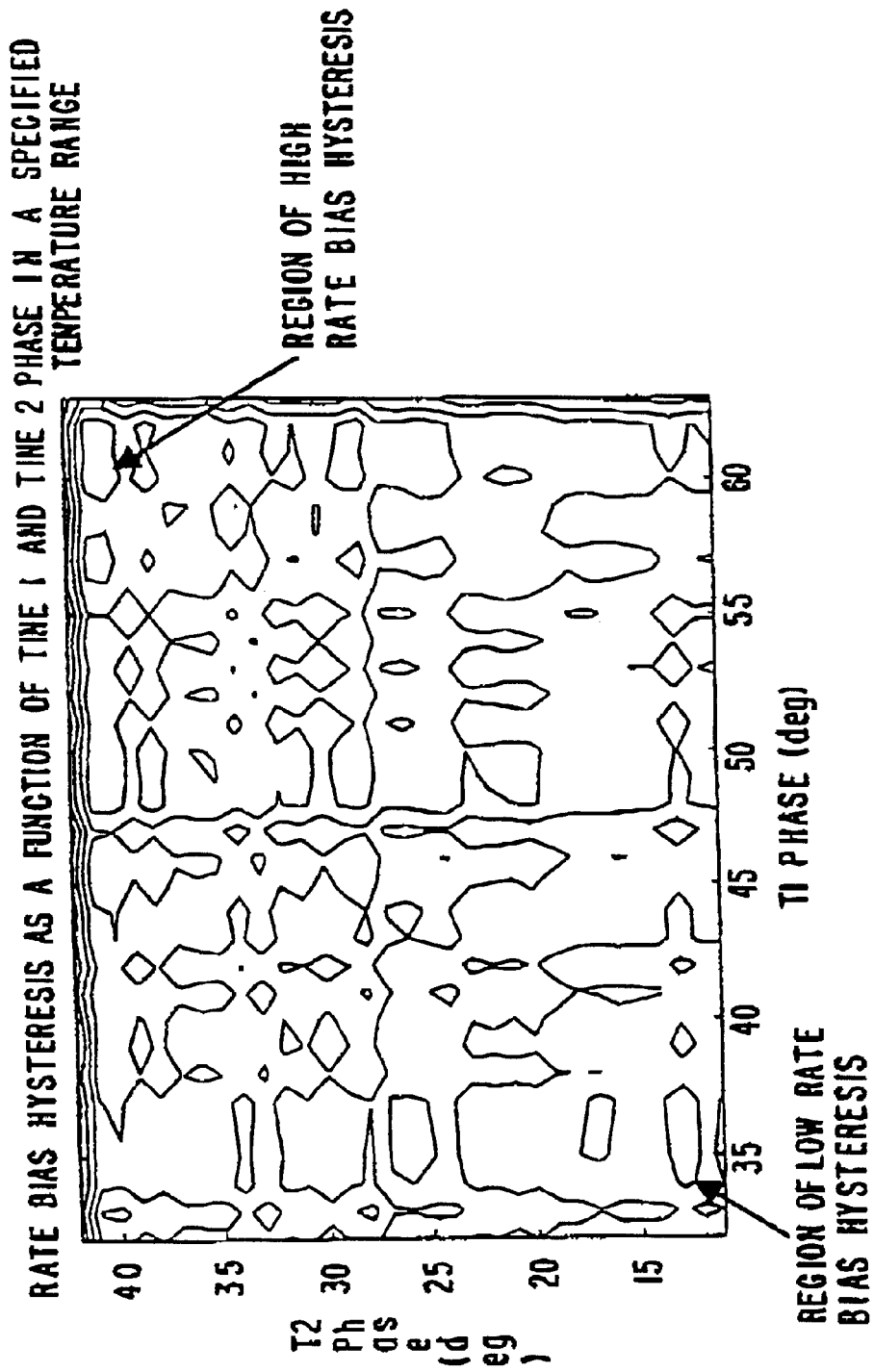
FIG. 8 shows a contour plot of rate bias hysteresis as a function of tine 1 and tine 2 phase in a specified temperature range.

5. At this point, a 4-dimensional function, i.e. the rate bias hysteresis as a function of tine 1 phase, tine 2 phase, and temperature has been derived from the original date. In order to prepare the data for the application of the dynamic programming method, it is necessary to break the full temperature range up into M bins (equally spaced in temperature). Within each temperature range, the mean hysteresis curve area as a function of tine 1 and tine 2 phase settings is computed. Within each temperature range, then, is a 3-dimensional function, namely, the rate bias hysteresis as a function of tine 1 phase and tine 2 phase. FIG. 8 shows a contour plot that represents this function; it shows the rate bias hysteresis versus tine 1 and tine 2 phase settings within a particular temperature range. In FIG. 8, the color in the plot is related to the rate bias hysteresis. Dark colors, i.e. black, represent areas of low hysteresis and bright colors, i.e. red, represent areas of high hysteresis.

6. At this point, a set of M 3-dimensional functions that represent the rate bias hysteresis as a function of $\phi_1$ and $\phi_2$ over temperature was obtained To find the optimum phase settings over temperature, the dynamic programming method was applied as previously described.

6. Normal Device Operation and Results

Application of the dynamic programming method will produce the phase settings that optimize the equation for the cost function J over temperature. After determining these optimum phase settings, one can fit a polynomial to the settings over temperature. The coefficients for this polynomial can then be stored in the memory of the computer that performs temperature compensation for the device during normal operation. During subsequent operation, the computer can read the current temperature and calculate the optimal phase setting for that temperature.

Figure 9:
FIG. 9 illustrates a comparison of results obtained for rate bias hysteresis by using a standard method and the optimized method of the invention.

FIG. 9 shows results obtained using a non-optimized method and the optimized method described in the present invention. In the non-optimal method, the values of $\phi_1$ and $\phi_2$ are chosen so that the value of the rate bias is zero at a temperature of 25 degrees Celsius; these values are then held constant over all temperatures. FIG. 9 shows the rate bias hysteresis for each of several mechanisms. On the y-axis, the figure shows the root-mean-square value of the rate bias hysteresis that was measured over temperature using the optimized and non-optimized methods. Results using the two methods are grouped together for each sensor. Each sensor is identified by its serial number, which is shown on the x-axis.

As FIG. 9 shows, using the optimized method of the invention results in a substantial performance improvement. By contrast, when using a non-optimized method, none of the 28 sensors meets the performance specification. Thus, when using the optimized method of the invention, 8 of the 28 sensors meet the target performance specification and 5 more come very close to meeting it.

Thus, while there have been described what are presently believed to be the preferred embodiments of the present invention, those skilled in the art will realize that other and further modifications can be made without departing from the true spirit of the invention and is intended to include all such modifications and variations as come within the scope of the claims as set forth below.

What is claim is:

1. A method for improving performance of a micromachined device having at least one sensing element, said sensing element having a rate bias used for determining a rate bias hysteresis over temperature, said method comprising:

determining at least two phase demodulation angles ($\phi_1$, $\phi_2$) at which said rate bias hysteresis is at a minimum according to the following steps
(i) collecting data on rate bias over a selected operating temperature range at selected phase demodulation angles for said at least one sensing element; and
(ii) selecting said at least two phase demodulation angles by applying a dynamic programming optimization method to the data collected in step (i).

2. The method of claim 1, wherein said dynamic programming optimization method comprises:

(i) assigning to each node of a dynamic programming grid said at least two phase demodulation angles $\phi_1,\phi_2$;

(ii) assigning to each level of said dynamic programming grid a discrete temperature T, at which $\phi_1$, and $\phi_2$ are measured;
(iii) assigning a cost penalty of occupying each node, said cost penalty being a function of said rate bias hysteresis over temperature.

3. The method of claim 2, wherein said cost penalty is determined according to the following formula:

$$J=W_\theta\theta(\phi_1,\phi_2)+W_\phi\Delta\phi^2+W_N\mathrm{Avg}(\theta_1,\theta_2,\ldots,\theta_n)+W_T(\theta_{T1}^2+\theta_{T2}^2)$$

wherein J is said cost penalty, $\theta(\phi_1,\phi_2)$ is the rate bias hysteresis at $(\phi_1,\phi_2)$, $\Delta\phi$ is the change in phase from a previous temperature $T_2$ to a current temperature $T_1$, Avg $(\phi_1,\phi_2,\ldots,\theta_n)$ is the average value of the rate bias hysteresis evaluated at n pairs of phase demodulation angles that neighbor $(\phi_1,\phi_2)$, and $\theta_{T1}$ and $\theta_{T2}$ are the rate biases for tines 1 and 2 at $(\phi_1,\phi_2)$, n is an integer that identifies phase pairs symmetrically surrounding $(\phi_1,\phi_2)$ in a two-dimensional space consisting of all admissible values of $(\phi_1,\phi_2)$, $W_\theta$, $W_\phi$, $W_N$, and $W_T$ are weights assigned to a restriction placed on $\phi_1$ and $\phi_2$, said weights being finite numbers greater or equal to 0.

4. The method of claim 3, further comprising a restriction on said cost penalty, wherein the difference between $\phi_1$ and $\phi_2$ remains constant.

5. A method of optimizing a cost function over an initially chosen temperature range by determining optimum phase settings, said method comprising:

(i) choosing a pair of phase demodulation angles, $\phi_1$ and $\phi_2$, at the highest temperature;
(ii) evaluating said cost function for said pair of phase demodulation angles;
(iii) determining a lowest-cost path by recording the minimum cumulative cost incurred in moving backward from the highest temperature to the next highest temperature until the lowest temperature is reached;
(iv) recording phase demodulation angles, $\phi_1$ and $\phi_2$, that lie on said lowest-cost path, at each temperature.

* * * * *